Nov. 14, 1961

A. BODENSCHATZ ET AL
VARIABLE DEPTH OPERATING MECHANISM
INCLUDING UNIVERSAL COUPLING

3,009,029

Filed Sept. 18, 1959

INVENTORS
AUGUST BODENSCHATZ
GEORGE J. GIESSNER
BY
ATTORNEYS

з,009,029
Patented Nov. 14, 1961

3,009,029
VARIABLE DEPTH OPERATING MECHANISM
INCLUDING UNIVERSAL COUPLING
August Bodenschatz, Philadelphia, Pa., and George J. Giessner, Oaklyn, N.J., assignors to I-T-E Circuit Breaker Company, Inc., Philadelphia, Pa., a corporation of Pennsylvania
Filed Sept. 18, 1959, Ser. No. 840,950
16 Claims. (Cl. 200—50)

This invention relates to an operating mechanism whereby a circuit breaker mounted within an enclosure may be operated from a handle exteriorly of the enclosure mounted to the cover thereof and represents an improvement over the mechanism illustrated in U.S. Patent 2,890,302. More particularly this invention relates to an operating mechanism for variable depth enclosures incorporating a universal coupling whereby the mechanism is capable of functioning even though there is extreme misalignment between the portion of the mechanism mounted to the cover and the portion of the mechanism mounted within the enclosure.

This invention contemplates the provision of a box having a hinged cover which carries a rotary control handle exteriorly thereon. The input plate of a universal coupling assembly is secured to the control handle interiorly of the cover for rotation by the handle.

In addition to the input plate, the universal coupling assembly comprises an intermediate plate mounted to the input plate and an output plate mounted to the intermediate plate. The mountings between the universal plates is such that the relative movement between the output and intermediate plates is at right angles to the relative movement between the intermediate and the input plates. A centering spring biases the plates of the universal coupling assembly to a center or neutral position.

Circularly arranged guide fingers extend from the output plate perpendicular thereto and away from the cover. The free ends of the guide fingers are outwardly flared to form a wide mouthed opening for the reception of the top plate of the extending mechanism which is mounted within the box.

The extending mechanism comprises a drive shaft which is positioned at right angles to the top plate with one end of the drive shaft being rigidly secured to the top plate. The other end of the drive shaft is rigidly secured to a cam having an aperture in which the control handle of the circuit breaker is disposed. The drive shaft is mounted for rotation about the longitudinal axis thereof with rotation of the drive shaft effecting operation of the circuit breaker operating handle.

The top plate is formed in the shape of a large disk which is of a diameter substantially equal to the diameter of the circle about which the universal output guide fingers are arranged. The float-like mounting between the plates of the universal mounting assembly permits relative movement between the plates so that the output plate will automatically align itself with the top plate of the mechanism mounted within the box even though there is extreme misalignment between the input plate and top plate.

A driving connection between the universal input plate and the extending mechanism is achieved by a driving latch comprising a dog which is mounted to the output plate, positioned perpendicular thereto, and biased toward the center thereof. The top plate disk is provided with a peripheral notch which receives the dog and in this manner, rotation of the universal input plate is transmitted to the top plate of the extending assembly which in turn causes rotation of the drive shaft and cam which effects operation of the circuit breaker operating handle. If the cover is closed when the control handle mounted thereon is not set at a position corresponding to the position of the circuit breaker operating handle the top plate disk will engage the driving latch dog and force it outwardly against its biasing means. Thereafter when the control handle is rotated, only at such time as the dog is aligned opposite the peripheral notch of the top plate will the biasing means acting on the dog force the dog into the top plate notch and thereafter the extending mechanism will rotate in unison with the control handle.

By utilizing the extending mechanism previously described, the same size box having the same control handle and mechanism mounted to its cover may be used to enclose circuit breakers of varying frame sizes. The only adjustment required is in the length of the single drive shaft. That is, the length of the drive shaft must be such that the top plate disk lies between the guide fingers of the universal output plate when the cover is closed.

It has been found that the utilization of a relatively large size disk as a top plate of the extending mechanism is a safety feature not found in similar mechanisms of the prior art. That is, the prior art devices have utilized a member projecting a relatively sharp member mounted within the box and extending toward the cover thereof. When it becomes necessary to either change the circuit breaker or perform an adjustment thereof, the serviceman's interest is usually directed to the circuit breaker. He then forgets that there is a mechanism in the enclosure which projects from the circuit breaker toward the cover to connect the cover mounted handle to the circuit breaker operating handle. Thus, the serviceman in moving his head toward the circuit breaker is in danger of having his eye or a portion of his head injured by the sharp projection.

It has been found that by utilizing the universal coupling assembly as previously outlined it is possible to effectively compensate for greater degrees of misalignment than it is possible to compensate for by utilizing the teachings of the prior art and still obtain reliable performance. In the prior art devices misalignment between the cover mounted mechanism and the mechanism mounted within the box is compensated for by resiliently mounting the extending mechanism with the resilient mounting permitting the extending mechanism to tilt. This often interferes with subsequent operation of the circuit breaker.

Misalignment between the cover mounted handle and the operating handle of the circuit breaker upon closing of the cover was compensated for in the prior art by spring means which permitted a portion of the cover mounted mechanism to move toward the cover. Of necessity, the degree of movement to be provided for was extremely large thereby necessitating enlargement of the cover mounted mechanism as a whole and the utilization of extremely complicated structures.

The simple universal coupling arrangement and driving latch of the instant invention provides an extremely reliable and simple construction which compensates for misalignment between the cover mounted mechanism and the bus mounted mechanism as well as for misalignment between the cover mounted control handle and the operating handle of the circuit breaker.

Accordingly, a primary object of the instant invention is to provide a novel operating mechanism which is operated externally of an enclosure for control of a circuit breaker mounted therein.

Another object is to provide a variable depth mechanism wherein the simple alternative of a single part will enable the same cover mounted mechanism to be utilized with enclosures of varying depths and with circuit breakers of more than a single frame size.

Still another object is to provide a novel means for aligning the cover mounted mechanism and the extending mechanism which is in engagement with the circuit breaker operating handle. More specifically the novel means comprises utilization of a universal coupling assembly.

A further object is to provide a novel driving connection between the cover mounted mechanism and the extending mechanism.

A still further object of this invention is to provide a housing and control means for a circuit breaker unit wherein the cover of the housing will always be in a latched condition except when the control handle is moved to an extreme position.

Yet another object of this invention is to provide means whereby the cover of the housing may be opened even though the handle be locked by a padlock in the "on" position, and in which the latch may be defeated under certain circumstances.

Still another object is to provide a novel driving latch arrangement which enables the cover to be closed even though the position of the exterior cover handle is not in a position corresponding to the position of the circuit breaker control handle.

The foregoing as well as other objects and features of the other invention will be apparent from the following description when taken in conjunction with the appended drawings in which.

Referring to the figures, a molded case circuit breaker unit B is shown enclosed within a housing or box C and mounted to the back panel 21 thereof, the box having a door or lid D hinged thereto at hinges 22 in a conventional manner. The usual gasket 23 is provided for the cover.

A description of the mechanism will now be given with particular reference to FIGURE 17 and as otherwise noted.

Figure 17:
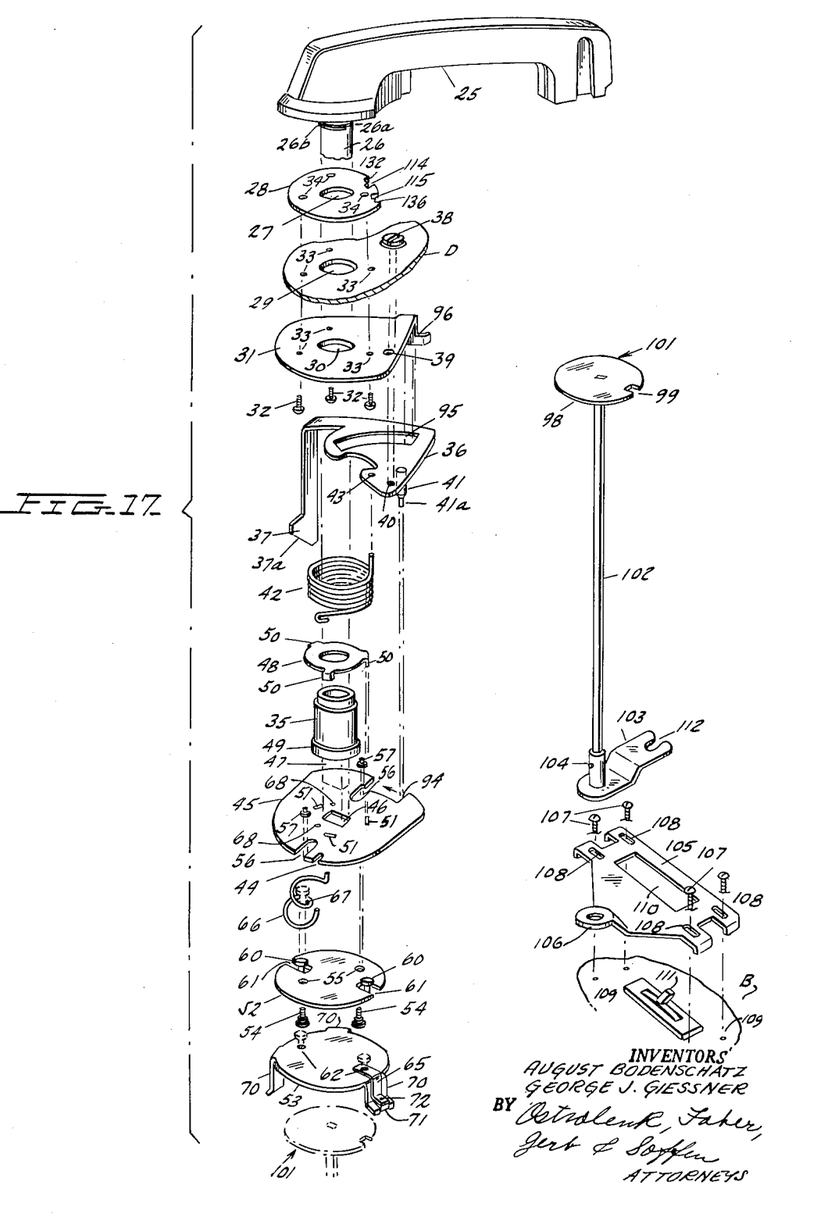
FIGURE 17 is an exploded perspective of the mechanism.

The invention as viewed on FIGURE 17 comprises a control handle 25 integral with a shaft 26 molded thereto, the shaft passing through a bore 27 in a notched locking plate 28 fastened exteriorly on the cover or door D, and thence, through a bore 29 in the door D, and through a bore 30 in a mounting plate 31 fastened interiorly to the door D. The elements 28 and 31 are secured to the door by means of bolts 32 passing through holes, such as 33, and having threaded engagement in aligned holes 34 in plate 28. Shaft 26 has a collar 35 surrounding it which is stationary and press fitted in bore 30 so as to be secured to mounting plate 31. Ring-shaped groove 26a in shaft 26 is positioned below locking plate 28 and receives retaining washer 26b thereby rotatably retaining handle 25 to cover D.

Carried on the mounting plate 31 is a latch plate 36, having a latch hook 37, which is pivoted to the mounting plate by the end defeater pin 38 passing through bores 39 and 40 and peened so as to grip the latch plate 36. Pin 38 has an integral slotted head accessible externally of cover D and plate 36 is provided with a pin 41 extending away from cover D, for a purpose to be hereinafter described. Latch hook 37 is operatively positioned to engage the peripheral edge of plate 101 to lock door D closed.

A spring 42 surrounds collar 35 with sufficient radial clearance so that it can be wound at least a partial turn without binding on the collar. One end of the spring 42 is suitably secured in a small bore 43 in the latch plate 36 while the other end is hook-like and bears in recess 44 of universal input plate 45. The plate 45 is provided with a rectangular slot 46 which keys the plate 45 to the rectangular end 47 of shaft 26. Bearing 48 rests upon shoulder 49 of collar 35 and is provided with downwardly projecting ears 50 which extend through holes 51 in plate 45. The free ends of ears 50 are staked thereby rotatably securing bearing 48 to collar 35.

Input plate 45 comprises a portion of a universal coupling means which also includes intermediate plate 52 and output plate 53. Pins 54, having enlarged heads, extend upwardly through clearance holes 55 in intermediate plate 52 and through elongated guide slots 56 in input plate 45. Retaining split washers 57, fitted within circular grooves of pins 54, operatively retain intermediate plate 52 to input plate 45 permitting relative movement therebetween journaled by guide slots 56.

Pins 60, having enlarged heads, extend downwardly through elongated guide slots 61 in intermediate plate 52 and clearance holes 62 in output plate 53 and spring member 65. The free ends of pins 60 are staked to operatively secure output plate 53 to intermediate plate 52 permitting relative movement therebetween journaled by guide slots 61.

It is to be noted that the plates 45, 52, 53 are journaled for movement parallel to cover D and that guide slots 61 are transverse to guide slots 56 being at substantially right angles thereto. Thus, an output plate 53 may be moved a considerable distance in any direction relative to input plate 45.

A single spring 66 is provided to bias intermediate and output plates 52, 53 to a centered position with respect to input plate 45. The center of spring 66 is looped at the center thereof with the loop 67 surrounding one of the pins 60. The ends of spring 66 are anchored in openings 68 of input plate 45. Spring 66 lies in a plane between input plate 45 and intermediate plate 52.

Output plate 53 is provided with three circularly arranged guide fingers 70 which extend away from cover D. Fingers 70 are outwardly flared at the free ends thereof to form a wide-mouthed opening which facilitates the entrance of disk 101 between guide fingers 70 upon closing of cover D.

One of the guide fingers 70 is provided with a central slot within which dog 71 is partially disposed. Dog 71 is riveted at 72 to spring 65 and is biased thereby into notch 99 of the top plate 101 when control handle 25 is aligned with circuit breaker operating handle 111 for effecting the operation thereof as will be hereinafter explained. Even when dog 71 is positioned within notch 99, a portion of dog 71 remains disposed in the slot of finger 70 which thereby provides the mechanical rigidity required for driving operating handle 111.

The portion of the mechanism hereinbefore described is generally designated the cover mounted mechanism while the mechanism which is about to be described is generally designated the extending mechanism of mechanism mounted within the case.

This latter mechanism comprises the disk forming top plate 101 which is keyed to square rod 102 at the top end thereof. The bottom end of rod 102 is secured to breaker cam bearing 103 by set screw 104. Bearing 103 is rotatably mounted to mounting plate 105 by having a bearing portion of reduced diameter (not shown) at the bottom end thereof inserted into opening of plate 105 and thereafter enlarged to prevent withdrawal therethrough.

Screws 107 pass through clearance slots 108 in plate 105 as well as through clearance holes 109 being received by threaded apertures (not shown) in back wall 21 of enclosure C. Thus, breaker B is mounted within enclosure C and mounting plate 105 is maintained in operative position relative to breaker B. Operating handle 111 extends through elongated plate opening 110 and is positioned within cam aperture 112 so that pivoting of rod 102 brings about operation of handle 111.

As cover D is pivoted to its closed position top disk 101 is engaged by the outwardly flared free ends of guide fingers 70. If the cover mounted and extending mechanisms are misaligned, one or both of the intermediate 52 and output plates 53 are moved against the force of centering spring 66 until output plate 53 is centered with respect to disk 101 and disk 101 is positioned within the circle defined by the non-flared portions of guide fingers 70.

During closing cam surface latch member 36 engages disk 101 and member 36 is rotated against its bias 42 about pin 38 until latch tip 37 falls beneath disk 101.

If upon closing the position of control handle 25 does not correspond to the position of circuit breaker handle 111, dog 71 engages the peripheral edge 98 of disk 101 and is thereby driven away from the center of output plate 53. Rotation of control handle 25 will not cause rotation of disk 101 until a time after the positions of handles 25 and 111 coincide. Once handles 25 and 111 coincide spring 65 drives dog 71 into notch 99 and thereafter dog 71 acts as a driving latch drivingly connecting the universal coupling means 45, 52, 53 to output disk 101.

In order to effect locking of the handle in either "on" or "off" positions, there are provided a pair of notches 114 and 115 in plate 28 which are radially aligned with the respective "on" and "off" indicia on the door D. These notches coact with a slidably mounted locking pin 120 in handle 25 having a forward edge 120a which can engage in either of the notches 114 and 115. Pin 120 is substantially of U shape so as to allow space for the fingers of an operator to fully grasp handle 25. The locking pin 120 is carried in a slot 122 molded in handle 25 and a spring 125 is carried in a slot 120b in locking pin 120, slot 122 in handle 25 being widened to form a recess 126 to accommodate spring 125. Thus, the spring 125 bearing against the shoulders at the ends of the recess 126, and the spring being under initial compression biases pin 120 to outward position so that a tab 120c which is formed at the extreme forward end of the pin 120 normally protrudes outwardly of the end of handle 25, the outer edge of the handle being sufficiently slotted to permit tab 120c to protrude therethrough.

Accordingly, by manual pressure on tab 120c, pin 120 can be thrust to the left against the bias of spring 125 so that edge 120a may be inserted in either notch 114 or 115 of latch plate 28, depending on whether handle 10 is at the "on" or the "off" position, pin 120 being locked in notch 110 for the "on" position, or pin 120 may be radially aligned for locking in notch 115 for the "off" position.

Plate 28 is provided with shoulders 132 and 136 which serve as stops to limit motion of handle 25 in either direction since pin 120 will engage shoulder 132 at the "on" position, and will engage shoulder 136 at the "reset" position. Pin 120 is then biased out of engagement with plate 28 by spring 125, as will be understood from the foregoing description, but edge 120a is always within the confines of the shoulders.

Figure 18:
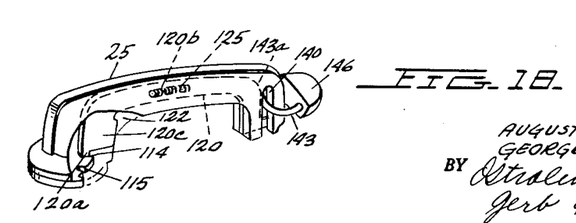
FIGURE 18 is a perspective showing details of the cover mounted control handle.

Handle 25, at its forward end, is provided with a sizable aperture 140, open at the bottom, to permit insertion of pin 120 during assembly. Aperture 140 is suitable to accommodate the hasp 143 of one or more padlocks 146 (FIGURE 18). Normally, the aperture 140, when pin 120 is biased outwardly, is blocked by the forward edge 143a of the pin 120; when, however, aperture 140 is cleared by rearward pushing of tab 120c, the padlock hasp 143 can be inserted in the aperture 140. Accordingly, it will be seen that pin 120 can be utilized to lock in either notch 114 or 115, and with the padlock hasp in aperture 140, the pin is prevented from moving outward since the portion comprising edge 143a of pin 120 is blocked by the hasp 143, thus handle 25 is lockable in either the "on" or "off" position, but not in any other position.

Figure 1:
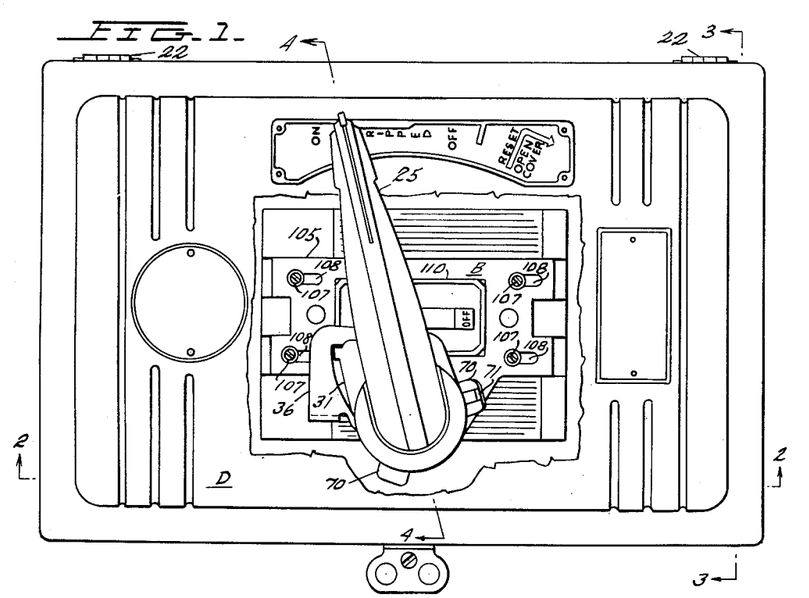
FIGURE 1 is a front view of the enclosure looking at the cover showing the exterior control handle in relation to the indicia plate, a portion of the cover being broken away to show certain elements of the mechanism.
Figure 2:
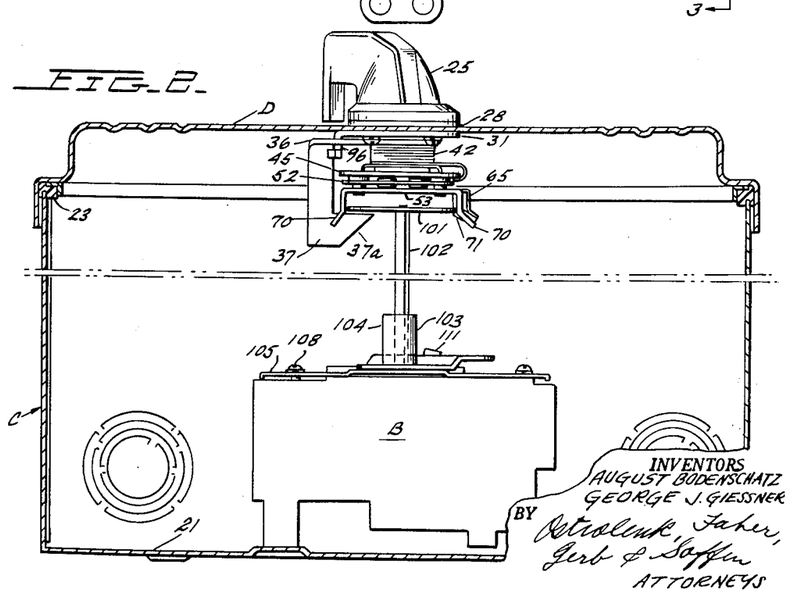
FIGURE 2 is a cross-section taken through line 2—2 of FIGURE 1 looking in the direction of arrows 2—2.
Figure 3:
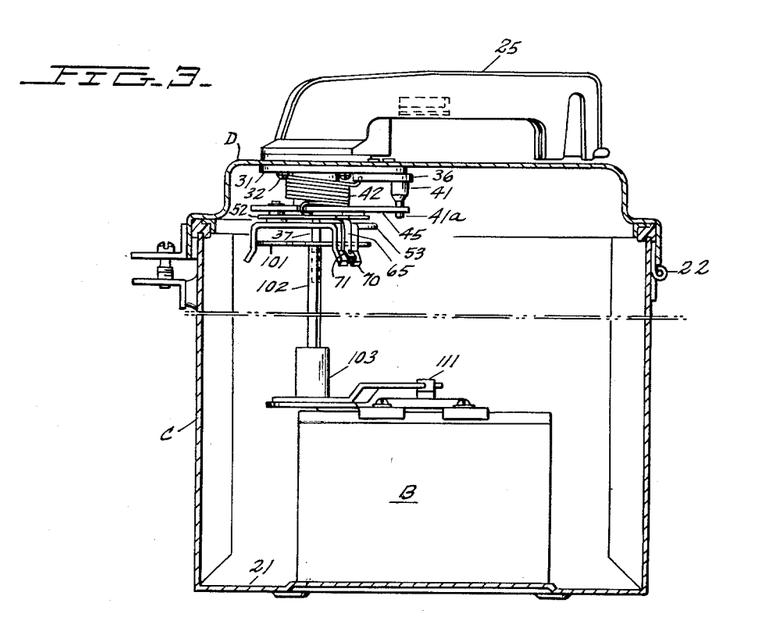
FIGURE 3 is a cross-section taken through line 3—3 of FIGURE 1 looking in the direction of arrows 3—3.
Figure 4:
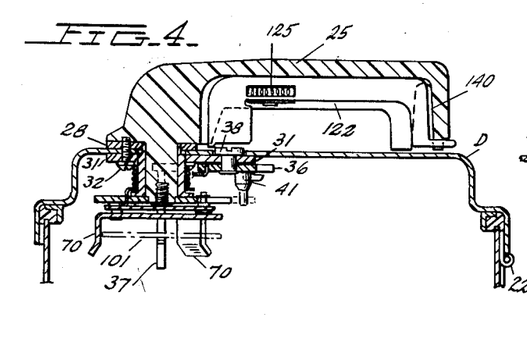
FIGURE 4 is a cross-section taken through line 4—4 of FIGURE 1 looking in the direction of arrows 4—4.
Figure 5:
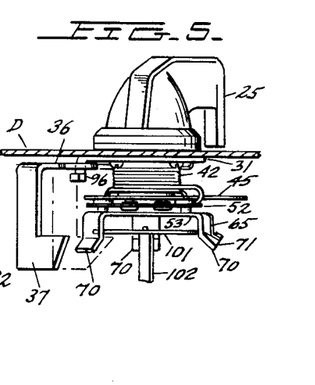
FIGURE 5 is a fragmentary portion of the mechanism showing the handle and cover latch when the handle is in the reset position thus releasing the cover latch.
Figure 6:
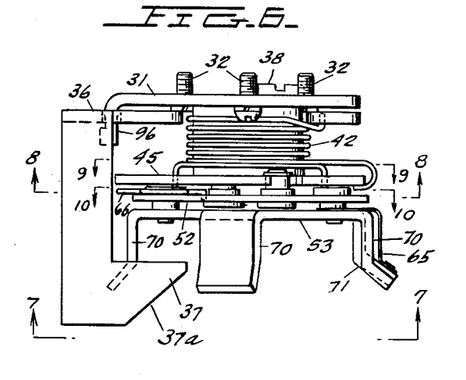
FIGURE 6 is an enlargement of the mechanism of FIGURE 2 mounted to the cover interiorly thereof.
Figure 7:
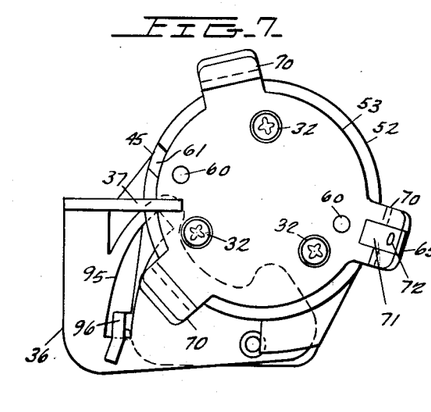
FIGURES 7–10 are cross-sections of FIGURE 6 taken through lines 7—7, 8—8, 9—9 and 10—10, respectively, looking in the direction of the arrows.
Figure 8:
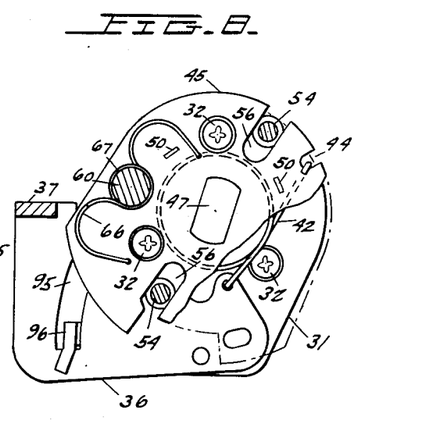
Figure 9:
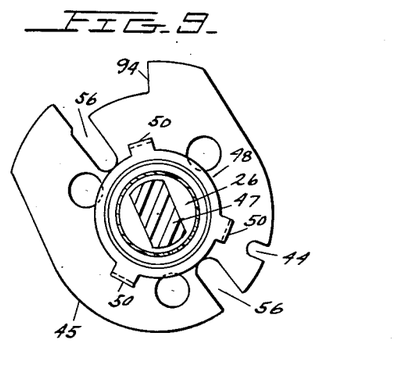
Figure 10:
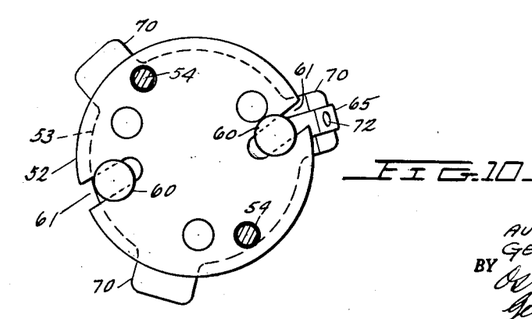
Figure 11:
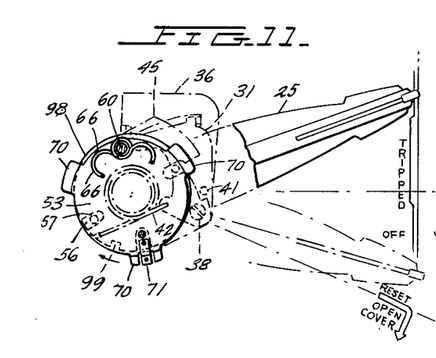
FIGURES 11–15 are fragmentary views of the mechanism in various positions of the cover mounted control handle.
Figure 12:
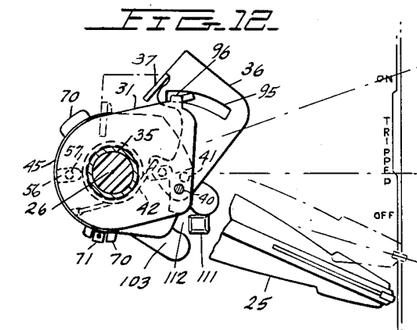
Figure 13:
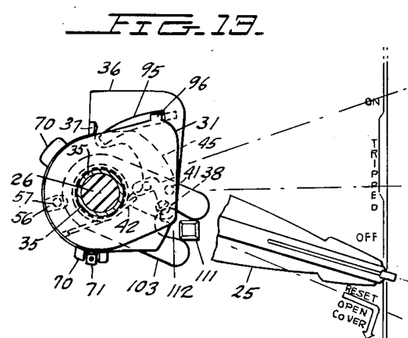
Figure 14:
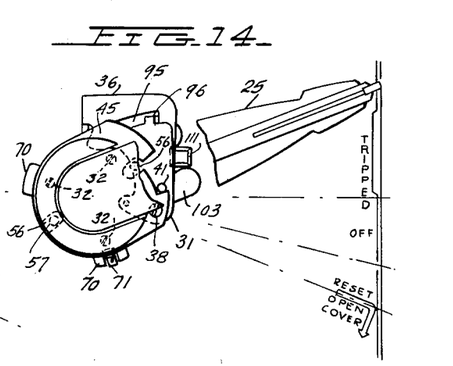
Figure 15:
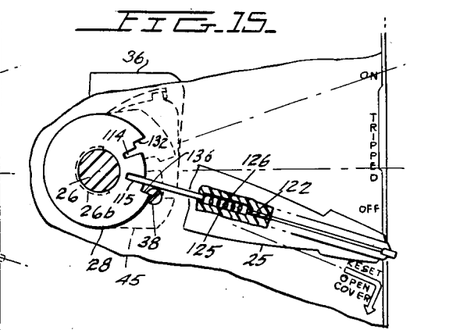
Figure 16:
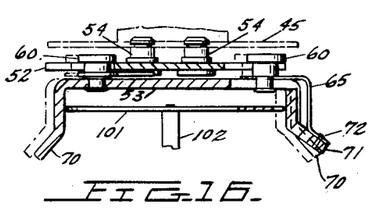
FIGURE 16 is a cross-section of the universal output plate taken through the driving latch.

Spring 42 lightly biases the handle 25 toward "on" position when the door D is open. Spring 42 also biases hook 35a toward latching engagement with ear 96 depending from member 31 and disposed within slot 95 of member 36; thus, rotating handle 25 to "reset" effects engagement of stud end 41a with cam rise 94 on input plate 45 to release latch hook 37 from top plate 101, the spring 42 being wound to tighten thereby effecting clockwise rotation of latch plate 36, reducing the diameter of the spring slightly, but not enough to bind on collar 35 owing to the initial radial spacing hereinabove mentioned. In order to open door D, when pin 120 is locked in notch 114, the "on" position of handle 25, the defeater pin 38 is rotated clockwise (FIGURE 1) by a suitable screw driver tool inserted in the partially accessible slot of the pin head and rotated to rotate hook 37 out of engagement with ear top plate 101.

Although spring 42 maintains plate 36 toward hook engaging position, as stated, when handle 25 is swung to "reset," pin end 41a engages the cam edge 94 to rotate plate 36 and thus unlock door D, full motion of the handle down to "reset" being required, a safety feature being thus effected.

In order to limit the arcuate motion of plate 36, the mounting plate 31 is provided with an ear 96 which is freely slidable in a slot 95 in plate 36. Thus, the arcuate travel of plate 36 is stopped by engagement of the edges of ear 96 with the respective ends of slot 95. Ear 96 has a tab which overlaps the end of the slot to serve as a retainer for plate 36 so that it will not be bent away from the door by tension exerted by locking engagement with top plate 101. The tab is of suitable dimension to always overlap the end of the slot toward which it points or the surface of plate 36 at the side of the slot, so that it will provide sliding support for the plate at any rotated position thereof.

In order to prevent defeating the latch 37, and thereby opening of the door D when the handle is in the "off" position and locked by a padlock in that position, the handle 26 closely overlays pin 38 so that access to the slot in the pin cannot be had. Thus, a repairman working on the line will not be endangered by having current turned on since the door cannot be opened by defeating the latch provided, of course, one or more padlocks are used to ensure the handle remaining in the locked "off" position. By virtue of the rotative mounting universal coupling means 45, 52, 53 and the extending mechanism, should the breaker open, the handle 111 thereof will snap downward carrying with it handle 25 to indicate "tripped" on the indicia plate P. In order to reset the breaker after it has opened, it is merely necessary to move handle 25 to "reset" position and then upwardly to the "on" position.

It will thus be seen that door D is always latched closed by engagement of hook 37 with top plate 101 unless such engagement is deliberately broken by rotation of pin 38. Further, pin 38 is not accessible to defeat the latch when handle 25 is at "off" position. In addition, resetting of the breaker is accomplished by handle 25 and here is no need to open door D for this purpose. However, the door can be opened, if desired, by moving handle 25 to the "reset" position. Finally, handle 25 may be locked in either the "on" or "off" positions by one or more padlocks without preventing opening of the breaker when padlocked in the "on" position.

As may readily be seen from the foregoing description, it is a simple matter to alter the extending mechanism so that a single cover mounted mechanism may be used with enclosures of varying depths regardless of the frame size of the circuit breaker mounted therein. That is, the only adjustment required is a mere cutting of a single rod 102 to compensate for the spacing between the cover mounted mechanism and the circuit breaker operating handle 111. Misalignment between the cover mounted mechanism and the extending mechanism is corrected by aligning means comprising the universal coupling assembly 45, 52, 53 with the plates thereof moving from their centered or neutral position as required to permit output plate 53 to be centered with respect to top plate 101.

While certain of the claims refer to the fact that the members are mounted against movement toward and away from the cover or along the axis of the extending rod, it is to be understood that limited movement in these directions are still present for purposes of permitting relative rotative or sliding movement between adjacent members. Nevertheless, these former movements are not built in for purposes of alignment compensation.

Having thus described this invention, it is apparent that various changes may be made without departing from the spirit thereof. Accordingly, this invention is not to be limited to the precise embodiment illustrated herein except as set forth in the appending claims.

We claim:

1. An operating mechanism for a variable depth enclosure wherein a circuit breaker unit having a manual operating handle is mounted; said enclosure including a cover; said operating mechanism comprising a cover mounted mechanism and an extending mechanism; said cover mounted mechanism including a control handle carried on the exterior side of said cover for manual control of said operating handle; a first end of said extending mechanism being in operative engagement with said operating handle and a second end of said extending mechanism being operably engageable by a portion of said cover mounted mechanism mounted on the interior side of said cover when said cover is closed; said cover mounted mechanism comprising a universal coupling means including a plurality of members mounted together for relative movement with respect to each other thereby compensating for misalignment between said cover mounted mechanism and said extending mechanism, said control handle being adapted for rotational movement, said universal coupling means being adapted for rotational movement in response to rotation of said control handle, the rotational movement of said universal coupling means being independent of said relative movement.

2. An operating mechanism for a variable depth enclosure wherein a circuit breaker unit having a manual operating handle is mounted; said enclosure including a cover; said operating mechanism comprising a cover mounted mechanism and an extending mechanism; said cover mounted mechanism including a control handle carried on the exterior side of said cover for manual control of said operating handle; a first end of said extending mechanism being in operative engagement with said operating handle and a second end of said extending mechanism being operably engageable by a portion of said cover mounted mechanism on the interior side of said cover when said cover is closed; said cover mounted mechanism comprising a rotatably movable universal coupling means including a plurality of stacked plates; means journalling first relative movement between a first and a second of said plates along a first line and means journalling second relative movement between a third and said second of said plates along a second line transverse to said first line, said first and second relative movements being transverse to the central axis of said extending mechanism.

3. An operating mechanism for a variable depth enclosure wherein a circuit breaker unit having a manual operating handle is mounted; said enclosure including a cover; said operating mechanism comprising a cover mounted mechanism and an extending mechanism; said cover mounted mechanism including a control handle caried on the exterior side of said cover for manual control of said operating handle; a first end of said extending mechanism being in operative engagement with said operating handle and a second end of said extending mechanism being operably engageable by a portion of said cover mounted mechanism on the interior side of said cover when said cover is closed; said cover mounted mechanism comprising a rotatably movable universal coupling means including a plurality of stacked plates; means journalling first relative movement between a first and a second of said plates along a first line and means journalling second relative movement between a third and said second of said plates along a second line transverse to said first line; said first and said second lines being substantially parallel to said cover, said first and second relative movements being substantially parallel to said cover.

4. An operating mechanism for a variable depth enclosure wherein a circuit breaker unit having a manual operating handle is mounted; said enclosure including a cover; said operating mechanism comprising a cover mounted mechanism and an extending mechanism; said cover mounted mechanism including a control handle carried on the exterior side of said cover for manual control of said operating handle; a first end of said extending mechanism being in operative engagement with said operating handle and a second end of said extending mechanism being operably engageable by a portion of said cover mounted mechanism on the interior side of said cover when said cover is closed; said cover mounted mechanism comprising a universal coupling means including a plurality of stacked plates; means journalling relative movement between a first and a second of said plates along a first line and means journalling relative movement between a third and said second of said plates along a second line transverse to said first line; biasing means urging said first, said second, and said third plates to predetermined relative positions relative to each other, said universal coupling means being mounted for rotational movement responsive to movement of said control handle, said rotational movement being independent of said relative movement.

5. An operating mechanism for a variable depth enclosure wherein a circuit breaker unit having a manual operating handle is mounted; said enclosure including a cover; said operating mechanism comprising a cover mounted mechanism and an extending mechanism; said cover mounted mechanism including a control handle carried on the exterior side of said cover for manual control of said operating handle; a first end of said extending mechanism being operably engageable by a portion of said cover mounted mechanism on the interior side of said cover when said cover is closed; said cover mounted mechanism comprising a universal coupling means including a plurality of stacked plates; means journalling relative movement between a first and a second of said plates along a first line and means journalling relative movement between a third and said second of said plates along a second line transverse to said first line; biasing means urging said first, said second, and said third plates to predetermined relative positions relative to each other; said biasing means comprising a single spring member having a looped portion intermediate the ends thereof in engagement with one of said first and said third plates and having both ends thereof seated upon the other of said first and said third plates.

6. An operating mechanism for a variable depth enclosure wherein a circuit breaker unit having a manual operating handle is mounted; said enclosure including a cover; said operating mechanism comprising a cover mounted mechanism and an extending mechanism; said cover mounted mechanism including a control handle carried on the exterior side of said cover for manual control of said operating handle; a first end of said extending mechanism being in operative engagement with said operating handle and a second end of said extending mechanism being operably engageable by a portion of said cover mounted mechanism on the interior side of said cover when said cover is closed; said cover mounted mechanism comprising a universal coupling means including a plurality of stacked plates; means journalling relative movement between a first and a second of said plates along a first line and means journalling relative movement between a third and said second of said plates along a second line transverse to said first line; means securing said first plate to said control handle for rotation in unison therewith; a plurality of guide fingers on said third plate arranged in a circle and extending away from said cover; said first end of said extending mechanism comprising a disk which, when said cover is closed, is disposed in the area defined by said guide fingers.

7. An operating mechanism for a variable depth enclosure wherein a circuit breaker unit having a manual operating handle is mounted; said enclosure including a cover; said operating mechanism comprising a cover mounted mechanism and an extending mechanism; said cover mounted mechanism including a control handle carried on the exterior side of said cover for manual control of said operating handle; a first end of said extending mechanism being in operative engagement with said operating handle and a second end of said extending mechanism being operably engageable by a portion of said cover mounted mechanism on the interior side of said cover when said cover is closed; said cover mounted mechanism comprising a universal coupling means including a plurality of stacked plates; means journalling relative movement between a first and a second of said plates along a first line and means journalling relative movement between a third and said second of said plates along a second line transverse to said first line; means securing said first plate to said control handle for rotation of said first, second and third plates in unison therewith; a plurality of guide fingers on said third plate arranged in a circle and extending away from said cover; said first end of said extending mechanism comprising a disk which, when said cover is closed, is disposed in the area defined by said guide fingers; said guide fingers having free ends thereof outwardly flared to form a wide-mouthed opening for said disk.

8. An operating mechanism for a variable depth enclosure wherein a circuit breaker unit having a manual operating handle is mounted; said enclosure including a cover; said operating mechanism comprising a cover mounted mechanism and an extending mechanism; said cover mounted mechanism including a control handle carried on the exterior side of said cover for manual control of said operating handle; a first end of said extending mechanism being in operative engagement with said operating handle and a second end of said extending mechanism being operably engageable by a portion of said cover mounted mechanism on the interior side of said cover when said cover is closed; said cover mounted mechanism comprising a universal coupling means including a plurality of stacked plates; means journalling relative movement between a third and said second of said plates along a second line transverse to said first line; means securing said first plate to said control handle for rotation of said first, second and third plates in unison therewith; a plurality of guide fingers on said third plate arranged in a circle and extending away from said cover; said first end of said extending mechanism comprising a disk which, when said cover is closed, is disposed in the area defined by said guide fingers; a dog mounted to said third plate and operatively positioned to be entered into a peripheral notch of said disk when said control and said operating handles are in corresponding positions while said cover is closed.

9. An operating mechanism for a variable depth enclosure wherein a circuit breaker unit having a manual operating handle is mounted; said enclosure including a cover; said operating mechanism comprising a cover mounted mechanism and an extending mechanism; said cover mounted mechanism including a control handle carried on the exterior side of said cover for manual control of said operating handle; a first end of said extending mechanism being in operative engagement with said operating handle and a second end of said extending mechanism being operably engageable by a portion of said cover mounted mechanism on the interior side of said cover when said cover is closed; said cover mounted mechanism comprising a universal coupling means including a plurality of stacked plates; means journalling relative movement between a third and said second of said plates along a second line transverse to said first line; means securing said first plate to said control handle for rotation of said first, second and third plates in unison therewith; a plurality of guide fingers on said third plate arranged in a circle and extending away from said cover; said first end of said extending mechanism comprising a disk which, when said cover is closed, is disposed in the area defined by said guide fingers; a dog mounted to said third plate and operatively positioned to be entered into a peripheral notch of said disk when said control and said operating handles are in corresponding positions while said cover is closed; said dog extending generally parallel to said fingers; means biasing said dog to a position closer to the center of said circle than said guide fingers.

10. An operating mechanism for a variable depth enclosure wherein a circuit breaker unit having a manual operating handle is mounted; said enclosure including a cover; said operating mechanism comprising a cover mounted mechanism and an extending mechanism; said cover mounted mechanism including a control handle carried on the exterior side of said cover for manual control of said operating handle; a first end of said extending mechanism being in operative engagement with said operating handle and a second end of said extending mechanism being operably engageable by a portion of said cover mounted mechanism on the interior side of said cover when said cover is closed; said cover mounted mechanism comprising a universal coupling means including a plurality of stacked plates; means journalling relative movement between a third and said second of said plates along a second line transverse to said first line; means securing said first plate to said control handle for rotation of said first, second and third plates in unison therewith; a plurality of guide fingers on said third plate arranged in a circle and extending away from said cover; said first end of said extending mechanism comprising a disk which, when said cover is closed, is disposed in the area defined by said guide fingers; a dog mounted to said third plate and operatively positioned to be entered into a peripheral notch of said disk when said control and said operating handles are in corresponding positions while said cover is closed; said dog extending generally parallel to said fingers; means biasing said dog to a position closer to the center of said circle than said guide fingers; one of said guide fingers having a slot therein; said dog having a first portion disposed within said slot when a second portion of said dog is disposed within the notch of said disk.

11. An operating mechanism for a variable depth enclosure wherein a circuit breaker unit having a manual operating handle is mounted; said enclosure including a cover; said operating mechanism comprising a cover mounted mechanism and an extending mechanism; said cover mounted mechanism including a control handle carried on the exterior side of said cover for manual control of said operating handle; a first end of said extending mechanism being in operative engagement with said operating handle and a second end of said extending mechanism being operably engageable by a portion of said cover mounted mechanism on the interior side of said cover when said cover is closed; said cover mounted mechanism comprising a universal coupling means including a plurality of stacked plates; means journalling relative movement between a first and a second of said plates along a first line and means journalling relative movement between a third and said second of said plates along a second line transverse to said first line; means securing said first plate to said control handle for rotation of said first, second and third plates in unison therewith; said extending mechanism also including an elongated rod centered with respect to said disk and extending perpendicular therefrom; said rod being mounted for rotation about the longitudinal axis thereof and against movement along said axis; a plurality of guide fingers on said third plate arranged in a circle and extending away from said cover; said first end of said extending mechanism comprising a disk which, when said cover is closed, is disposed in the area defined by said guide fingers.

12. An operating mechanism for a variable depth enclosure wherein a circuit breaker unit having a manual operating handle is mounted; said enclosure including a cover; said operating mechanism comprising a cover mounted mechanism and an extending mechanism; said cover mounted mechanism including a control handle carried on the exterior side of said cover for manual control of said operating handle; a first end of said extending mechanism being in operative engagement with said operating handle and a second end of said extending mechanism being operably engageable by a portion of said cover mounted mechanism on the interior side of said cover when said cover is closed; said cover mounted mechanism comprising a universal coupling means including a plurality of stacked plates; means journalling relative movement between a first and a second of said plates along a first line and means journalling relative movement between a third and said second of said plates along a second line transverse to said first line; means securing said first plate to said control handle for rotation of said first, second and third plates in unison therewith; said extending mechanism also including an elongated rod centered with respect to said disk and extending perpendicular therefrom; said rod being mounted for rotation about the longitudinal axis thereof and against movement along said axis; said first, said second, and said third plates being mounted to each other in as well as to said control handle in a manner such that the plates comprising said universal coupling means are maintained against movement toward and away from said cover; a plurality of guide fingers on said third plate arranged in a circle and extending away from said cover; said first end of said extending mechanism comprising a disk which, when said cover is closed, is disposed in the area defined by said guide fingers.

13. An operating mechanism for a variable depth enclosure wherein a circuit breaker unit having a manual operating handle is mounted; said enclosure including a cover; said operating mechanism comprising a cover mounted mechanism and an extending mechanism; said cover mounted mechanism including a control handle carried on the exterior side of said cover for manual control of said operating handle; a first end of said extending mechanism being in operative engagement with said operating handle and a second end of said extending mechanism being operably engageable by a portion of said cover mounted mechanism on the interior side of said cover when said cover is closed; said cover mounted mechanism comprising a universal coupling means including a plurality of stacked plates; means journalling relative movement between a third and said second of said plates along a second line transverse to said first line; means securing said first plate to said control handle for rotation of said first, second and third plates in unison therewith; a plurality of guide fingers on said third plate arranged in a circle and extending away from said cover; said first end of said extending mechanism comprising a disk which, when said cover is closed, is disposed in the area defined by said guide fingers; a dog mounted to said third plate and operatively positioned to be entered into a peripheral notch of said disk when said control and said operating handles are in corresponding positions while said cover is closed; said cover mounted mechanism also including a latch engageable with the disk of said extending means for latching of said cover to said enclosure.

14. An operating mechanism for a variable depth enclosure wherein a circuit breaker unit having a manual operating handle is mounted; said enclosure including a cover; said operating mechanism comprising a cover mounted mechanism and an extending mechanism; said cover mounted mechanism including a control handle carried on the exterior side of said cover for manual control of said operating handle; a first end of said extending mechanism being in operative engagement with said operating handle and a second end of said extending mechanism being operably engageable by a portion of said cover mounted mechanism on the interior side of said cover when said cover is closed; said cover mounted mechanism comprising a universal coupling means including a plurality of stacked plates; means journalling relative movement between a third and said second of said plates along a second line transverse to said first line; means securing said first plate to said control handle for rotation of said first, second and third plates in unison therewith; a plurality of guide fingers on said third plate arranged in a circle and extending away from said cover; said first end of said extending mechanism comprising a disk which, when said cover is closed, is disposed in the area defined by said guide fingers; a dog mounted to said third plate and operatively positioned to be entered into a peripheral notch of said disk when said control and said operating handles are in corresponding positions while said cover is closed; said cover mounted mechanism also including a latch engageable with the disk of said extending means for latching of said cover to said enclosure; means operable by said control handle to move said latch to an unlatching position upon operation of said control handle to an extreme position thereof.

15. An operating mechanism for a variable depth enclosure wherein a circuit breaker unit having a manual operating handle is mounted; said enclosure including a cover; said operating mechanism comprising a cover mounted mechanism including a control handle carried on the exterior side of said cover for manual control of said operating handle; a first end of said extending mechanism being in operative engagement with said operating handle and a second end of said extending mechanism being operably engageable by a portion of said cover mounted mechanism on the interior side of said cover when said cover is closed; said cover mounted mechanism comprising a universal coupling means including a plurality of stacked plates; means journalling relative movement between a third and said second of said plates along a second line transverse to said first line; means securing said first plate to said control handle for rotation of said first, second and third plates in unison therewith; a plurality of guide fingers on said third plate arranged in a circle and extending away from said cover; said first end of said extending mechanism comprising a disk which, when said cover is closed, is disposed in the area defined by said guide fingers; a dog mounted to said third plate and operatively positioned to be entered in a peripheral notch of said disk when said control and said operating handles are in corresponding positions while said cover is closed; said cover mounted mechanism also including a latch engageable with the disk of said extending means for latching of said cover to said enclosure; means operable by said control handle to move said latch to an unlatching position upon operation of said control handle to an extreme position thereof; defeater means mounted to said cover and operable to move said latch to unlatching position; said defeater means being inaccessible for operation when said control handle is in an "Off" position.

16. An operating mechanism for a variable depth enclosure wherein a circuit breaker unit having a manual operating mechanism comprising a cover mounted mechanism and an extending mechanism; said cover mounted mechanism including a control handle carried on the exterior side of said cover for manual control of said operating handle; a first end of said extending mechanism being in operative engagement with said operating handle and a second end of said extending mechanism being operably engageable by a portion of said cover mounted mechanism on the interior side of said cover when said cover is closed; said cover mounted mechanism comprising a universal coupling means including a plurality of stacked plates; means journalling relative movement between a first and a second of said plates along a first line and means journalling relative movement between a third and said second of said plates along a second line transverse to said first line; said first and said second lines being substantially parallel to said cover; biasing means urging said first, said second, and said third plates to predetermined relative positions relative to each other; said biasing means comprising a single spring member having a looped portion intermediate the ends thereof in engagement with one of said first and said third plates and having both ends thereof seated upon the other of said first and said third plates; means securing said first plate to said control handle for rotation of said first, second and third plates in unison therewith; a plurality of guide fingers on said third plate arranged in a circle and extending away from said cover; said first end of said extending mechanism comprising a disk which, when said cover is closed, is disposed in the area defined by said guide fingers; said guide fingers having free ends thereof outwardly flared to form a wide-mouthed opening for said disk; a dog mounted to said third plate and operatively positioned to be entered into a peripheral notch of said disk when said control and said operating handles are in corresponding positions while said cover is closed.

References Cited in the file of this patent

UNITED STATES PATENTS

| | | |
|---|---|---|
| 2,797,579 | Blachut et al. | July 2, 1957 |
| 2,890,302 | Benedictis | June 9, 1959 |